United States Patent [19]

Vercellone et al.

[11] 4,089,211

[45] May 16, 1978

[54] ELASTOMERIC BEARING TEST MACHINE

[75] Inventors: Robert Joseph Vercellone, North Haven; Samuel Philip Baron, Fairfield, both of Conn.

[73] Assignee: United Technologies Corporation, Hartford, Conn.

[21] Appl. No.: 737,373

[22] Filed: Nov. 1, 1976

[51] Int. Cl.² ............................................. G01M 13/04
[52] U.S. Cl. .................................... 73/93; 73/432 SD
[58] Field of Search .................... 73/67, 67.3, 91, 93, 73/99, 101, 432 R, 432 SD

[56] References Cited

U.S. PATENT DOCUMENTS

| | | | |
|---|---|---|---|
| 3,580,059 | 5/1971 | Dalton | 73/432 R X |
| 3,605,488 | 9/1971 | Foster | 73/93 X |
| 3,871,210 | 3/1975 | Himmler et al. | 73/67 |

Primary Examiner—Charles A. Ruehl
Attorney, Agent, or Firm—Vernon F. Hauschild

[57] ABSTRACT

Apparatus and method for testing elastomeric bearings used for mounting articulated rotor blades on the main rotor head of a helicopter wherein the blade is held stationary and the rotor hub is moved to subject the bearing to simulated flight loads and motions simultaneously, including centrifugal loading and blade flapping, lead-lag, and pitch change motions.

17 Claims, 5 Drawing Figures

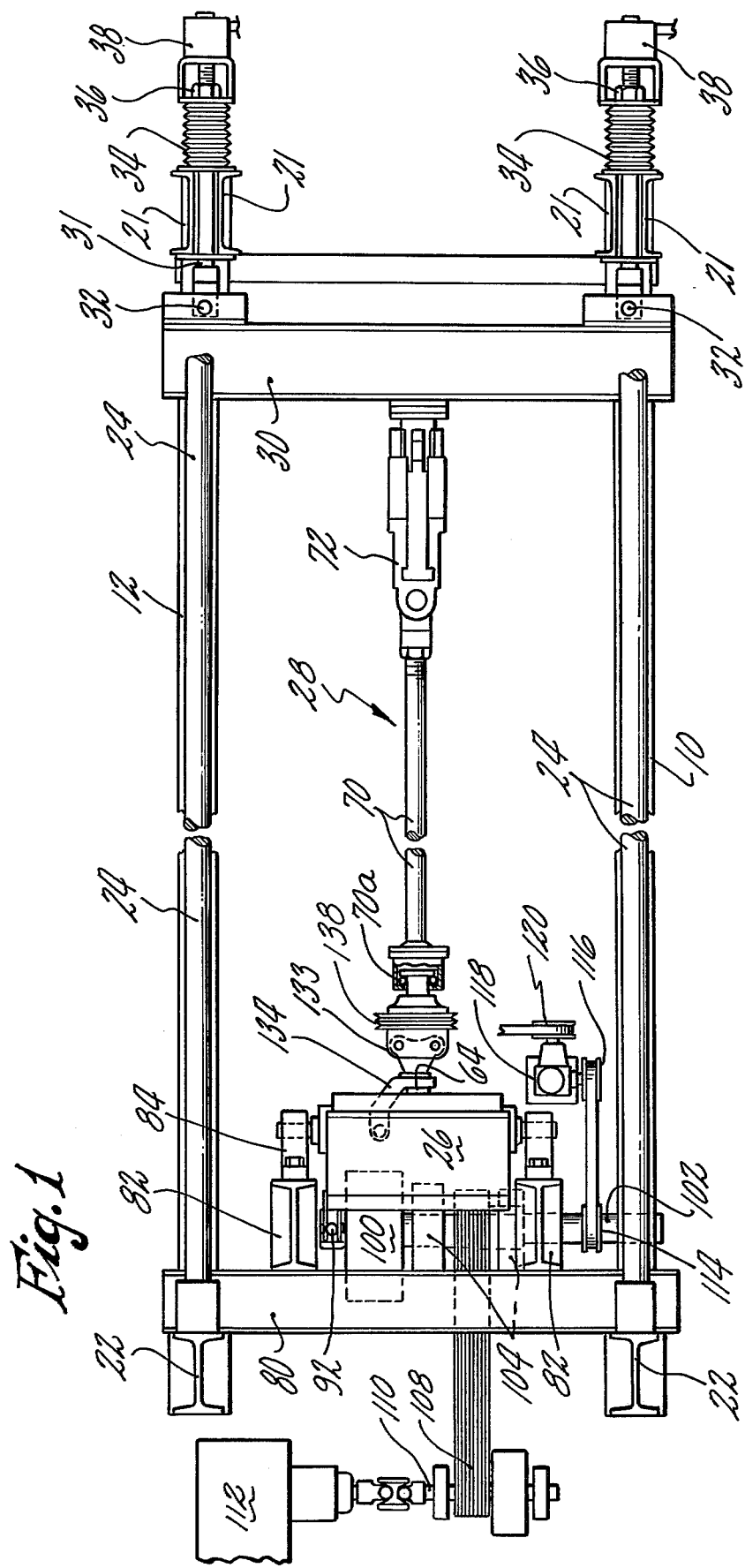

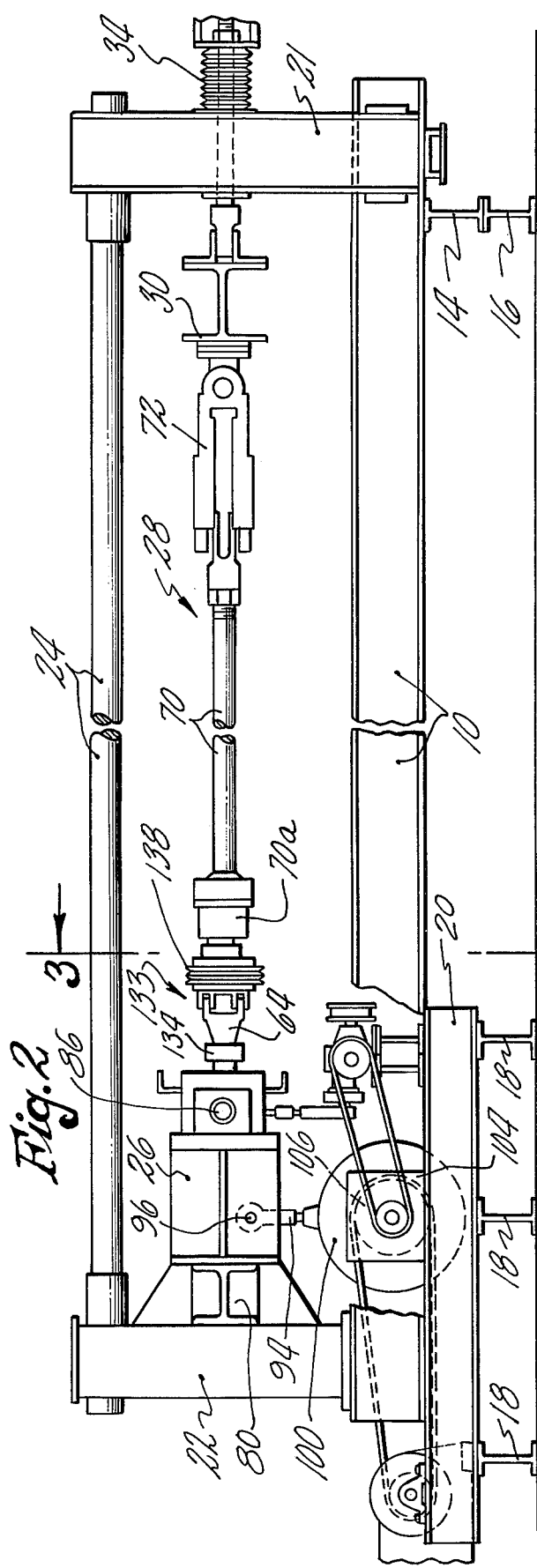
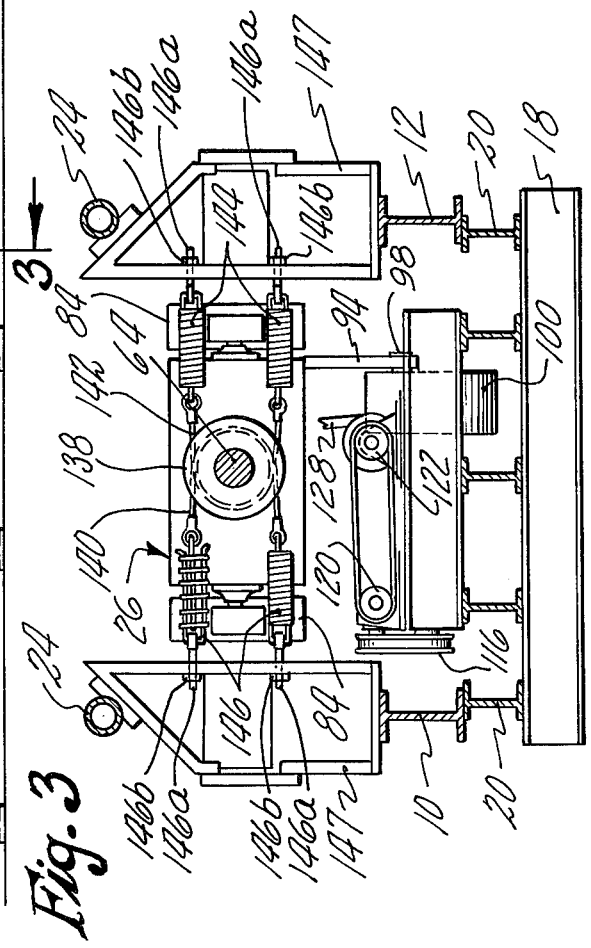

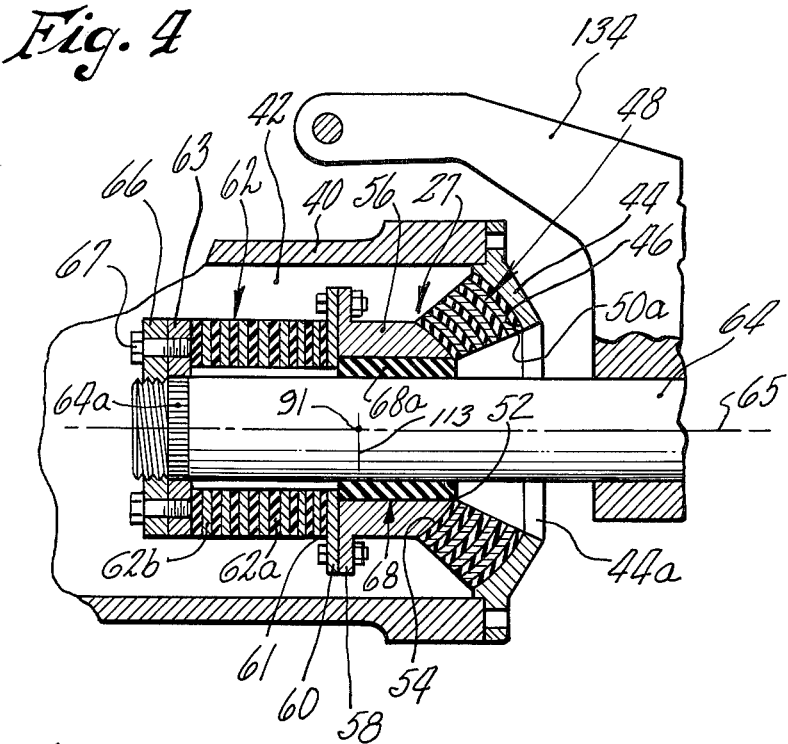
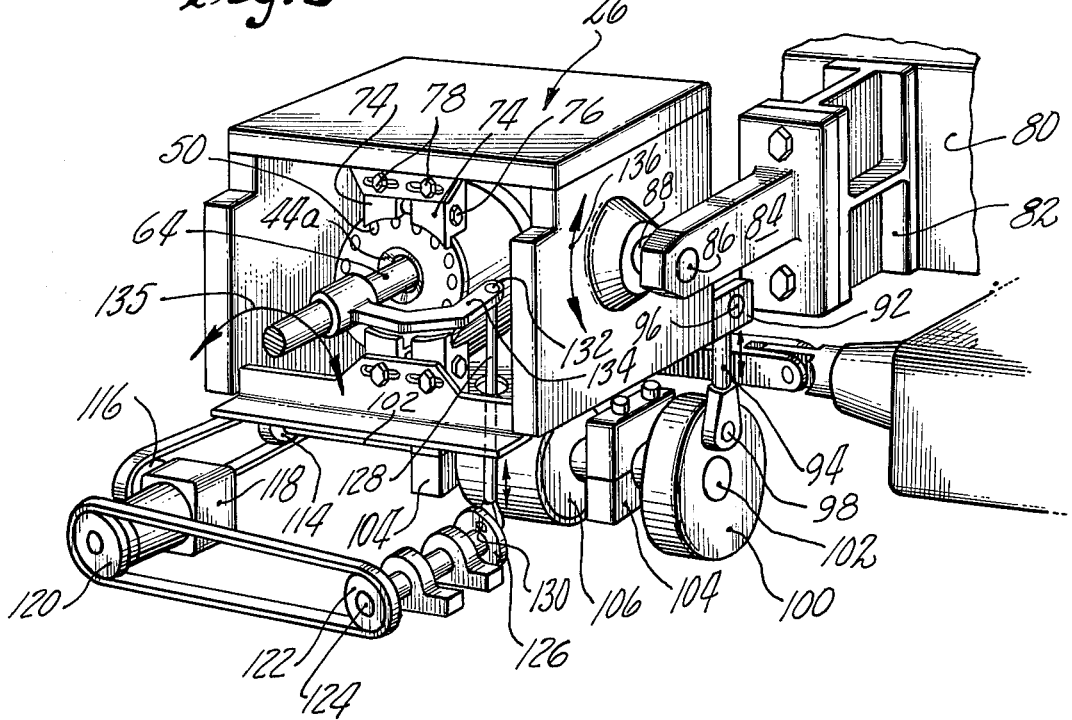

ELASTOMERIC BEARING TEST MACHINE

BACKGROUND OF THE INVENTION

1. Field of the Invention

This invention relates to an improved bearing testing machine and method for testing elastomeric bearings used in the main rotor head of helicopters for mounting the rotor blades for centrifugal loading and for flapping, lead-lag, and pitch changing motions.

2. Description of the Prior Art

Previous machines for testing elastomeric bearings for helicopter rotors have maintained the bearing assembly and its mounting stationary and imparted flapping, lead-lag, and pitch changing motions to the bearing by moving the blade in an attempt to simulate the forces experienced in the bearing under actual flight conditions. This required large motions of the blade working against centrifugal loading of the blade which produced high crank loads. Because of the large motions of the blade very high inertia loads due to the moving mass were produced.

SUMMARY OF THE INVENTION

A primary object of this invention is to provide an improved machine and method for testing elastomeric bearings intended for use in the main rotor head of helicopters in which large movements of the blade and resulting very high crank loads and high inertia loads are avoided.

Another object of the present invention is the provision of such a machine and method in which a much improved simulation of the loads imposed on the bearing in actual flight conditions is obtained, thus producing more accurate test results.

In accordance with the present invention the bearing being tested is mounted in the machine for oscillatory movement of the bearing about its flapping axis. The blade which is held stationary against flapping and lag-lead movements is subjected to longitudinal axial tension which applies a load on the bearing that simulates centrifugal forces encountered by the bearing in flight. The flapping and lead-lag movements of the blade experienced in flight are applied in this machine to the bearing instead of to the blade. Further, means is provided for imparting pitch change movement to the blade spindle to simulate the constantly changing forces generated in the bearing due to variations in aerodynamic load on the blade resulting from continuously changing pitch during flight.

A further object of this invention is to provide means for testing the blade pitch changing components.

These and other objects and advantages of the present invention will become evident from the following description of a preferred embodiment of the invention.

BRIEF DESCRIPTION OF THE DRAWINGS

FIG. 1 is a plan view of the test machine showing an elastomeric bearing mounted under simulated centrifugal loading for flapping, lead-lag, and pitch changing movements relative to its attached stationary rotor blade;

FIG. 2 is a side elevation of the test machine of FIG. 1;

FIG. 3 is a section on line 3—3 of FIG. 2 showing means, omitted from FIGS. 1 and 2, which can be used for imparting pitch change load to the pitch changing components to simulate the constantly changing aerodynamic load exerted on the blade resulting from changes in pitch during flight;

FIG. 4 is an enlarged sectional detail of the bearing assembly; and

FIG. 5 is a perspective view of simulated rotor head showing the mounting structure for the bearing assembly.

DESCRIPTION OF THE PREFERRED EMBODIMENT

Referring to the drawings, the frame of the machine includes essentially two longitudinal I-beams 10 and 12 which are supported at their right-hand ends (FIG. 2) on two transverse I-beams 14, 16 stacked one above the other. At their other ends I-beams 10, 12 are supported on transverse I-beams 18 (FIGS. 2 and 3) and longitudinal I-beams 20. At the left-hand corners of the framing two vertical I-beams 22 are welded at their lower ends to beams 10, 12 and at the right-hand corners back-to-back channels 21 are welded at their lower ends to beams 10, 12 these channels 21 having their backs spaced apart to provide a space through which rods 31, hereinafter referred to, can freely pass. The upper ends of beams 22 and channels 21 are connected by heavy rods 24 running lengthwise of the frame at the front and back of the frame.

Elastomeric bearings of the type tested on this machine are used to mount the blades on helicopter main rotors having articulated rotor heads. A plurality of blades are supported substantially radially from the rotor hub for rotation about an upstanding rotor drive shaft to provide lift for the helicopter in a well-known fashion, each blade being attached to the rotor hub by an elastomeric bearing. U.S. Pat. No. 3,782,854, issued Jan. 1, 1974 to Robert C. Rybicki, and assigned to the assignee of this application, discloses an articulated rotor head equipped with elastomeric bearings and reference is made to this patent for a more detailed disclosure of the mounting for the blades on a helicopter rotor.

Herein the elastomeric bearing to be tested, generally indicated at 27, is mounted at the left hand end of the frame in a simulated rotor head 26. A simulated rotor blade 28 attached to bearing 27 at its left-hand end is mounted along the length of the frame, being pivotally secured at its extremity to a cross beam 30 which is free to move lengthwise of the frame. Movement of the beam to the right results in stressing the blade in tension and stressing the bearing 27 in compression to simulate the centrifugal forces encountered by the bearing due to a rotating blade in flight. Beam 30 is moved to the right to tension the blade by two rods 31 which are pivoted thereto at 32. Rods 31 extends through the spaces between the backs of channels 21, through stacks of Belleville springs 34 and terminate in threaded ends to receive holding nuts 36. A hydraulic jack 38 is provided for each rod to provide, initially, the desired tension on the rods, after which the nuts 36 are turned down against the springs to hold the rods under the desired tension.

The rotor hub of a helicopter has an integral radially extended chamber-defining housing 40 for each blade (FIG. 4) which forms a blade attaching chamber 42 therewithin. For the purposes of this invention one of these housings 40 has been cut away from the rotor hub and made a part of the test machine. Elastomeric bearing 27 is mounted in housing 40 exactly as it is mounted on a helicopter rotor.

Housing 40 is cylindrical and has its outboard end closed by a member 44 (FIG. 4) which defines a circular flared opening 44a from chamber 42 and which also defines a spherical inner surface 46 which constitutes the outer race of the laminated, annular and spherical elastomeric bearing portion 48 of bearing 27 being tested. Closure member 44 is detachably secured to housing 40 by bolts 50 (FIG. 5), thus securing spherical bearing portion 48 to housing 40.

Spherical bearing portion 48 comprises a plurality of spherically shaped laminates which are alternately elastomeric and metal bonded together. One elastomeric end laminate 50a is bonded to outer race 46 on member 44. The other elastomeric end laminate 52 is bonded to spherical surface 54 of a cylindrical connecting member 56. Surface 54 comprises the inner race of spherical bearing portion 48. Member 56 has a circular flange 58 which is bolted to circular plate 60, face 61 of which forms the outer race of an axial elastomeric bearing portion generally indicated at 62. The latter comprises a plurality of alternate washer-shaped elastomeric plates 62a and metal plates 62b bonded together. The outermost elastomeric plate 62a of bearing portion 62 is bonded to the outer race 61 and the innermost elastomeric plate 62a is bonded to the outer surface of bearing end plate 63, the outer face of which forms the inner race of bearing portion 62.

The end of the blade which is attached to the elastomeric bearing 27 has a shaft 64 which lies on the blade pitch change axis 65 and extends through the flared opening 44a in cover member 44 and through an axial passage in bearing 27, terminating in a threaded end on which a nut 66 is received. Bearing end plate 63 and shaft 64 have a splined connection at 64a and cap screws 67 are extended through nut 66 and threaded into end plate 63. This construction provides means for transmitting both torsional and axial loads from shaft 64 to bearing 67. A journal-type bearing indicated at 68 is provided between shaft 64 and cylindrical connecting member 56 which permits rotation of shaft 64 in elastomeric bearing 27 even when the latter is laterally stressed as will be hereinafter explained. Bearing 68 consists of an elastomeric cylinder bonded at 68a to connecting member 56.

In this test machine it is not necessary to mount the entire blade since, other than to tension the bearing to simulate centrifugal forces, only the blade shaft portion 64 in the vicinity of bearing 27 is used to apply simulated stresses to the bearing being tested. Consequently the outboard portion of the blade is replaced by pivotally connected links 70, 72 which are required to transmit tension only. Link 70 is connected to shaft 64 by a thrust bearing 70a which permits shaft 64 to move about its longitudinal axis relative to link 80, and by an adapter 133.

Housing 40 with elastomeric bearing to be tested mounted therein is itself mounted within simulated rotor head 26 by means of two diametrically opposed pairs of arcuate clamping members 74 (FIG. 5) which can be drawn together by bolts 76 and clamped to simulated rotor head 26 by bolts 78. To support rotor head 26 on the frame of the machine a transverse beam 80 (FIG. 1) is secured to the upstanding corner I-beams 22 at the left hand end of the machine to which short vertical I-beams 82 are welded at opposite sides of member 26. I-beams 82 have bolted thereto horizontal arms 84 which have journal bearings 86 at their extremities in which trunnions 88 on simulated rotor head 26 are journalled. The horizontal axis of trunnions 88 lies on the flapping axis 113 (FIG. 4) of elastomeric bearing 27 and also intersects blade pitch change axis 65.

As previously stated, it is a feature of our invention to apply the flapping and lead-lag motions directly to the hub support for the elastomeric bearing being tested while holding the simulated blade stationary against movement about its flapping axis 113 and lead-lag axis 91 and under axial tension. To this end simulated rotor head 26 is provided with a rearwardly extended lug 92 to which the upper end of a connecting rod 94 is pivotally connected at 96. The other end of rod 94 is pivotally connected at 98 to an eccentric 100 mounted on a shaft 102 supported on bearings 104 and beams 20 beneath member 26. Shaft 102 has a pulley 106 belt driven from a pulley 108 on shaft 110. The latter is driven by motor 112 to oscillate simulated rotor head 26 in vertical planes about flapping axis 113 of elastomeric bearing 27 at a frequency of rotation of a blade in cruising flight. Bearing 27 will be oscillated at the same frequency since it is supported within simulated rotor head 26.

Means is also provided to rotate blade shaft 64 about its longitudinal axis 65 to apply pitch changing motions to bearing 27 in synchronism with the motions imparted to this bearing by simulated rotor head 26. Herein a pulley 114 (FIGS. 1 and 5) on shaft 102 drives an input pulley 116 on a reduction gear assembly 118 that has an output pulley 120 which belt drives a pulley 122 (FIG. 5) on shaft 124, the other end of which has fixed thereto an eccentric 126. A connecting rod 128 pivoted at 130 to eccentric 126 has a ball-and-socket connection at 132 to blade pitch horn 134 which is connected to shaft 64 of blade 28. As shaft 64 oscillates as indicated by arrow 135 in FIG. 5, elastomeric bearing 27 is subjected to torsional forces which similate the forces encountered in flight due to blade pitch changes. These oscillations of shaft 64 are synchronized with the oscillations of simulated rotor head 26 indicated by arrow 136.

In FIG. 3 we have shown an additional feature of our invention for enabling the test machine to be used for testing the durability of the components which apply torsional loads to shaft 64 due to pitch changes. Adapter 133 has a double sheave pulley 138 fixed thereto over which cables 140, 142 are run and oppositely extended. The ends of each cable are attached to springs 144, 146 which are supported by rods 146a extended through box-like structures 147 mounted at their lower ends on I-beams 10, 12, respectively, and fixed to rods 24 at their upper ends. By adjusting nuts 146b on rods 146a the tension of springs 144, 146 can be varied to vary the load on the pitch changing components.

To understand the operation of our testing machine it will be recalled that the elastomeric bearing being tested is rigidly mounted within simulated rotor head 26 with the attached simulated blade 28 held stationary against movement about its flapping axis 113 and lead-lag axis 91 (FIG. 4) and under axial tension. The tension of the blade is transmitted to the bearing from shaft 64 to simulate the centrifugal load on the bearing due to rotation of a blade in flight. This simulated centrifugal load is reacted by both bearing portions 48 and 62 which are compressed thereby.

Forces due to flapping and lead-lag movements of a blade in flight are applied to bearing 27 by eccentric 100, causing simulated rotor head 26 to oscillate in vertical planes about flapping axis 113 of the bearing. These forces are resisted by conical bearing portion 48 due to the presence of journal bearing 68. Because bearing portion 48 is conical it is possible to combine the flapping movements about axis 113 and the lead-lag movements about axis 91 into a single movement about axis 113 which is the resultant of both the flapping and the lead-lag movements.

Forces due to blade pitch changes originating in eccentric 126 and transmitted through connecting rod 128 and blade horn 134 are applied to shaft 64 as torsional forces tending to rotate this shaft about blade pitch axis 65. These torsional forces are reacted by both conical bearing portion 48 and axial bearing portion 62.

It will thus be evident that the bearing test machine of our invention is capable of applying forces to the bearing closely simulating those encountered in flight. Also the test machine can be made more compact since the blade itself is not used to apply flapping and lead-lag forces to the bearing as in previous machines. This permits the use of a simulated blade which is greatly shortened. Since large movements of the blade against centrifugal forces are avoided in the present machine, the high input forces and resulting high inertia loads previously experienced in testing machines for elastomeric bearings are avoided.

We wish it to be understood that we do not desire to be limited to the exact details of construction shown and described, for obvious modifications will occur to a person skilled in the art.

We claim:

1. A machine for testing elastomeric bearings for helicopter rotors comprising an elongated test bed, a simulated rotor head at one end of said bed in which a bearing is mounted, a simulated blade supported on said bed including a shaft at one end attached to said bearing, said blade having its other end attached to a member movable axially of said bed, means for moving said member to apply a compressive force to said bearing which simulates the centrifugal forces encountered by a bearing due to blade rotation in normal flight, means for supporting said rotor head for oscillations about the flapping axis of said bearing to simulate forces normally encountered by said bearing due to flapping and lead-lag movements of a blade in flight, means for oscillating said rotor head, and means for oscillating said shaft about its longitudinal axis to apply torsional forces to said bearing simulating aerodynamic forces encountered by a bearing in normal flight due to changes in blade pitch.

2. The combination of claim 1 in which the rotor head is mounted on trunnions and the bearing is mounted in the rotor head with its flapping axis coincident with the axis of said trunnions.

3. The combination of claim 1 in which the means for oscillating the rotor head is an eccentric mounted on a shaft and a motor for driving said eccentric at a speed equivalent to the speed of rotation of a helicopter rotor at cruising speed.

4. The combination of claim 3 in which the shaft of the blade has a blade pitch changing horn for oscillating said blade shaft and the means for oscillating the blade shaft is an eccentric driven in synchronism with the eccentric for oscillating said rotor head.

5. A machine for testing elastomeric bearings for helicopter rotors comprising an elongated test bed, a simulated rotor head at one end of said bed in which a bearing is rigidly mounted with its flapping axis transverse to the length of said bed, a simulated blade disposed along said bed including an axial shaft at one of its ends which is attached to said bearing, said blade having its other end fixed to a transverse frame member, means for moving said frame member along said bed to stress said blade and said bearing, means for mounting said rotor head for oscillatory movement about the flapping axis of said bearing, means for oscillating said rotor head at a frequency corresponding to rotor speed to subject said bearing to forces simulating those encountered in flight due to flapping and lead-lag movements of a helicopter blade, means including a blade pitch horn on said shaft for oscillating the latter about its longitudinal axis for applying forces to said bearing simulating aerodynamic forces due to blade pitch changes in flight, and means for oscillating said rotor head and said shaft in synchronism while said blade under tension is stationary about its flapping and lead-lag axis.

6. A machine for testing elastomeric bearings for helicopter rotors comprising an elongated bed, a bearing supporting housing simulating a radial portion of a helicopter rotor hub, an elastomeric bearing to be tested mounted in said housing, means for supporting said housing for oscillation about the flapping axis of said bearing, a simulated blade supported on said bed having an axial shaft at one end attached to said bearing and having its other end attached to a transverse member movable along said bed, means for moving said frame member to stress said blade and said bearing to simulate centrifugal forces acting on a bearing due to blade rotation in flight, means for oscillating said blade shaft about its longitudinal axis to simulate the torsional forces applied to a bearing in flight due to changes in blade pitch, and means for operating said oscillating means in synchronism with rotor speeds encountered in normal cruising flight while holding said blade against movement about the flapping and lead-lag axes of said bearing.

7. The combination of claim 6 in which the transverse member is moved along the bed of the machine by rods which extend through upstanding frame members and through a plurality of Belleville springs and terminate in threaded ends on which nuts are threaded to hold said blade and its attached bearing under stress.

8. A machine for testing elastomeric bearings for helicopter rotors comprising a bed, means for mounting an elastomeric bearing at one end of said bed, a simulated blade extended along said bed including an axial shaft attached to said bearing, means for stressing said blade and said bearing axially to simulate centrifugal forces encountered by said bearing in flight due to blade rotation, means for oscillating said bearing bodily about its flapping axis to simulate forces normally generated in said bearing due to flapping and lead-lag movements of a blade in flight, and means for oscillating said blade shaft about its longitudinal axis to simulate in said bearing forces normally generated due to blade pitch changes, the oscillating means for said bearing and said blade shaft being operated while the longitudinal axis of said blade remains stationary.

9. A machine for testing elastomeric bearings for helicopter rotors including an elongated bed, means for mounting an elastomeric bearing on trunnions at one end of said bed for oscillatory movement about its flapping axis, a simulated blade extended along said bed having an axial shaft at one end which is fixed in said bearing and having its other end attached to the frame of said bed, means for oscillating said bearing, and means for oscillating said shaft about its longitudinal axis in timed relation to oscillations of said bearing.

10. The combination of claim 9 in which the means for oscillating said blade shaft about its longitudinal axis comprises blade pitch changing components including a blade horn, and means for varying the load on said pitch changing components.

11. Means for testing elastomeric bearings for helicopter rotor blades comprising a frame for supporting a bearing blade assembly, said assembly including a simulated rotor head having a bearing to be tested mounted thereon and a simulated blade including an axial shaft extended at one end through said bearing and fixed thereto, said blade having its other end fixed to said frame and axially movable relative thereto for stressing said blade axially and compressing said bearing, means for oscillating said bearing about its flapping axis while said blade remains stationary and under tension to simulate centrifugal forces due to blade rotation in flight, and means for applying forces to said bearing which simulate aerodynamic loads on said bearing due to blade pitch changes in flight including means for oscillating said blade shaft about its longitudinal axis in synchronism with the oscillations of said bearing.

12. The method of testing an elastomeric bearing for helicopter rotors which consists in mounting the bearing to be tested in a simulated rotor head at one end of an elongated bed, mounting a simulated blade with its axial shaft attached to said bearing, moving the free end of said blade axially to put said blade in tension and said bearing in compression, oscillating said rotor head about the flapping axis of said bearing to simulate forces on said bearing due to flapping and lead-lag movements of a blade in flight, and oscillating said blade shaft about its longitudinal axis in synchronism with the movements of said rotor head to apply torsional movements of said shaft to said bearing to simulate forces acting on said bearing due to blade pitch changes in flight.

13. The method of testing elastomeric bearings for helicopter rotors which consists in rigidly mounting the bearing to be tested in a simulated rotor head, supporting said rotor head for oscillatory movements about the flapping axis of the bearing, supporting a simulated blade with its axial shaft attached to said bearing, applying an axial force to said blade to simulate centrifugal forces acting on said blade in actual flight, oscillating said rotor head to apply forces to said bearing which simulate forces encountered in flight due to flapping and lead-lag movements of a blade, oscillating said blade shaft in synchronism with the oscillations of said rotor head to apply forces to said bearing simulating changes in aerodynamic loading of said bearing in flight due to blade pitch changes, and continuing said oscillations of said rotor head and said shaft while holding said blade under tension and stationary relative to said rotor head.

14. The method of testing an elastomeric bearing for helicopter rotors which consists in mounting a bearing to be tested in a test machine for movement about its flapping axis, supporting a simulated blade in said machine with its axial shaft attached to said bearing, applying an axial load to said shaft and bearing to simulate centrifugal forces generated by a blade in flight, oscillating said bearing about its flapping axis to simulate forces acting on said bearing due to flapping and lead-lag movements of a blade in flight, oscillating said blade shaft about its longitudinal axis in synchronism with said oscillations of said bearing to simulate forces encountered by said bearing due to pitch changes in flight, and continuing said oscillations of said bearing and shaft while holding said blade under axial tension and stationary relative to said machine.

15. The method of testing an elastomeric bearing for helicopter rotors which consists in mounting a bearing to be tested at one end of an elongated bed of the test machine, mounting a simulated blade on said bed with its axial shaft attached to said bearing, applying an axial force to said blade to simulate centrifugal forces acting on a blade in flight, oscillating said bearing about its flapping axis to simulate forces acting on a bearing due to flapping and lead-lag movements of a blade in flight, oscillating said shaft about its longitudinal axis to simulate aerodynamic forces acting on said bearing in flight due to blade pitch changes, and continuing said oscillations of said bearing and shaft while maintaining said blade stationary relative to said bed.

16. The method of testing an elastomeric bearing for helicopter rotors which consists in mounting the bearing to be tested on a simulated rotor head in a test machine, mounting a simulated blade on said bearing, moving the free end of said blade axially to stress said bearing in compression to simulate centrifugal forces encountered in flight, oscillating said rotor head about the flapping axis of said bearing to simulate forces encountered by a bearing in normal flight due to flapping and lead-lag movements of a blade, and oscillating said blade about its longitudinal axis to generate torsional forces in said bearing to simulate aerodynamic forces in said bearing due to changes in blade pitch in flight, and continuing said oscillations of said rotor head and blade while holding the latter in tension and stationary about the flapping and lead-lag axes of said bearing.

17. The method of testing elastomeric bearings for helicopter rotors which consists in mounting a simulated rotor head on the test machine on trunnions for oscillatory movements, supporting a bearing to be tested on said rotor head with its flapping axis coincident with the axis of said trunnions, mounting a simulated blade on said test machine with one of its ends fixed in said bearing and its other end fixed to an axially movable member on said machine, moving said member to put said blade in tension and subject said bearing to compression to simulate centrifugal forces encountered in flight, oscillating said rotor head at a frequency equal to rotor speed in cruising flight to simulate forces encountered by a bearing in flight due to flapping and lead-lag movements of a blade, oscillating said blade about its longitudinal axis to simulate torsional forces on a bearing due to blade pitch changes in flight, and continuing and oscillations while maintaining said blade under tension.

* * * * *